US006552987B1

(12) United States Patent
Asada et al.

(10) Patent No.: US 6,552,987 B1
(45) Date of Patent: Apr. 22, 2003

(54) OPTICAL DISK APPARATUS WHEREIN RECORDING CLOCK SIGNAL IS STOPPED BEING SUPPLIED TO SEMICONDUCTOR LASER DRIVE CIRCUIT ON OPTICAL PICKUP DURING REPRODUCTION OPERATION (75) Inventors: Akihiro Asada, Yokohama (JP); Toshimitsu Kaku, Hitachinaka (JP); Takashi Hoshino, Yokohama (JP); Masaaki Kurebayashi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/463,007

(22) PCT Filed: Jul. 30, 1999

(86) PCT No.: PCT/JP99/04114
§ 371 (c)(1),
(2), (4) Date: Jan. 19, 2000

(87) PCT Pub. No.: WO01/09883
PCT Pub. Date: Feb. 8, 2001

(51) Int. Cl.[7] .................. G11B 7/0045; G11B 7/125
(52) U.S. Cl. ................. 369/59.11; 369/59.24; 369/47.52
(58) Field of Search .................. 369/116, 47.51–47.52, 369/47.3, 59.11, 59.24

(56) References Cited

U.S. PATENT DOCUMENTS

| | | | | |
|---|---|---|---|---|
| 4,718,068 A | * | 1/1988 | Yoshikawa | 372/31 |
| 4,761,775 A | * | 8/1988 | Murakami | 369/46 |
| 4,793,812 A | * | 12/1988 | Sussman et al. | 434/116 |
| 4,841,504 A | * | 6/1989 | Yamaguchi et al. | 369/32 |
| 4,891,690 A | * | 1/1990 | Hasegwa et al. | 358/75 |
| 5,067,120 A | * | 11/1991 | Yamauchi | 369/59 |
| 5,631,887 A | * | 5/1997 | Hurst, Jr. | 369/59 |
| 5,790,332 A | * | 8/1998 | Bucska | 360/51 |
| 5,802,031 A | * | 9/1998 | Clark et al. | 369/59 |
| 6,028,828 A | * | 2/2000 | Maeda | 369/50 |
| 6,069,864 A | * | 5/2000 | Kim | 369/116 |
| 6,483,791 B1 | * | 11/2002 | Asada et al. | 369/59.11 |

FOREIGN PATENT DOCUMENTS

| | | |
|---|---|---|
| EP | 0628960 | 12/1994 |
| JP | 5-258527 | 10/1993 |
| JP | 6-52569 | 2/1994 |
| JP | 6-349098 | 12/1994 |
| JP | 11-283249 | 10/1999 |

OTHER PUBLICATIONS

Nikkei Electronics, Oct. 20, 1997, No. 701, pp. 178–182, Fig. 17–Fig. 20 * No translation.

* cited by examiner

Primary Examiner—W. R. Young
Assistant Examiner—Gautam R. Patel
(74) Attorney, Agent, or Firm—Antonelli, Terry, Stout & Kraus, LLP (57) ABSTRACT

According to the present invention, in an optical disk apparatus constructed to supply signals for controlling a semiconductor laser drive circuit provided to an optical pickup from a signal processing circuit through a flexible cable, the semiconductor laser drive circuit is so constructed as to generate a drive current signal for the semiconductor laser on the basis of a binary signal and a clock signal which are supplied from the signal processing circuit through the flexible cable and the signal processing circuit is so constructed as to supply the clock signal during recording of data and stop the supply of the block signal during reproduction of data.

13 Claims, 6 Drawing Sheets

OPTICAL DISK APPARATUS WHEREIN RECORDING CLOCK SIGNAL IS STOPPED BEING SUPPLIED TO SEMICONDUCTOR LASER DRIVE CIRCUIT ON OPTICAL PICKUP DURING REPRODUCTION OPERATION

TECHNICAL FIELD

The present invention relates to a technique of recording and reproducing information on and from an optical disk representing a recording medium, and more particularly, to an information recording and reproducing technique which can prevent S/N degradation in a reproduction system due to cross talk with the reproduction system caused by circuit operation in a recording system when the information (inclusive of address information recorded on the recording medium in advance) is read out of the recording medium.

BACKGROUND ART

In the field of products concerning the optical disk such as CD, DVD and the like, an increase in capacity of the optical disk and an increase in speed of data transfer in an optical disk apparatus have recently been desired more and more. Also, with the capacity of the optical disk increased, mark and space (corresponding to 1, 0 of information) to be formed on the optical disk are required to be finer and formation of such fine mark and space is required in the optical disk apparatus.

In order to form accurate and fine mark and space, one mark recording waveform is required to have a multi-pulse form in a drive current waveform for a semiconductor laser during recording and a pulse position or pulse width at the mark start end and a pulse position or pulse width at the mark termination end must be controlled adaptively in accordance with a mark length of its own and an adjoining space length. For example, in a DVD-RAM, the aforementioned adaptive control of the pulse position or pulse width is required to be performed in T/16 to T/32 steps (T being a minimum unit for determining the mark and space lengths and corresponding to the period of a so-called channel clock chCLK).

Further, the drive current waveform is also needed to be quaternary in contrast to the conventional binary and so has become complicated. In addition, with the data transfer speed increased, the frequency of the aforementioned drive current waveform has become higher.

As the capacity and data transfer speed increase in this manner, current at multiple-valued levels supplied to the semiconductor laser must be switched at a high speed. To assure such a high-speed current switching characteristic as above (rise characteristic: Tr characteristic and fall characteristic: Tf characteristic of the drive current), it is preferable that the semiconductor laser drive circuit be disposed in the proximity of the semiconductor laser.

To meet this requirement, a conventional semiconductor laser drive circuit is so constructed as to have a plurality of current sources at least one of which is externally selected to drive the semiconductor laser. Therefore, as the drive current waveform has multiple valued levels, the number of control signal lines for selecting the current source increases. Further, when the semiconductor laser drive circuit is carried on an optical pickup, control signals are supplied through a flexible cable, facing a difficulty that because of dullness of the control signal waveforms and the difference (skew) in delay amount between control signals, the accurate drive current waveform cannot be obtained.

As an optical disk apparatus for solving the difficulty as above, the present applicant has proposed an optical disk apparatus described in Japanese Patent Application No. 10-206083 filed on Jul. 22, 1998, which was published on Oct. 15, 1999, as Japanese Patent Application Laid-Open No. 11-283249.

A semiconductor laser drive circuit shown in Japanese Patent Application No. 10-206083 is comprised of drive waveform information memory means for storing one or more information of drive waveform which drives a semiconductor laser in compliance with a binary recording signal (for example, NRZ signal) to be recorded on a recording medium, drive waveform decoding means for decoding the drive waveform on the basis of the information stored in the drive waveform information memory means, means for generating an address for selecting the drive waveform information of the drive waveform information memory means on the basis of the binary recording signal, control means for storing the externally supplied drive waveform information in the drive waveform information memory means, and n-multiplying means (so-called PLL) for n-multiplying a clock signal CLK supplied through a flexible cable to deliver a channel clock signal chCLK and supplying the channel clock signal as operation clock signal for the address generation means and the drive waveform decoding means.

The drive waveform decoding means generates timing signals for N equal division (for example, 16 or 32 equal division in the DVD-RAM) of the period T of the chCLK by using a delay line on the basis of the channel clock signal chCLK delivered out of the n-multiplying means, thus permitting the aforementioned control of the pulse width or pulse position.

With this construction, when the drive waveform information is stored in the drive waveform information memory means in advance through the control means, the drive current waveform is generated during recording by supplying the binary recording signal (NRZ), the clock signal CLK and a signal WRgate for control of the recording or reproducing operation mode to the semiconductor laser drive circuit carried on the optical pickup through the flexible cable, so that the semiconductor laser can be driven nearby and the difficulty of the conventional example that the drive current waveform is distorted owing to the dullness or skew of the control signals on the flexible cable can be eliminated to thereby assure desired Tf and Tf characteristics.

In case the multiplying number n of the n-frequency means is set to 4, the frequency of the clock signal CLK equals ¼ of the chCLK and as compared to the conventional example (the current source selecting signal having the same frequency as chCLK must be supplied), the frequency of the control signals on the flexible cable can be reduced to ¼ as compared to the conventional example and the EMI generated from the flexible cable can be reduced. To add, in the DVD-RAM, the frequency of the NRZ signal (repetition of 3T length mark and 3T length space gives a maximum frequency) is ⅙ of the channel clock signal chCLK.

As the capacity of the optical disk increases (densifying), however, the level of the reproduction signal for reading information from the recording medium decreases and for the sake of assuring reliability of reproduction data, the influence such as cross talk from the recording circuit system to the reproduction circuit system must be more decreased. The optical pickup carries photodetectors for detecting a reflection light beam from the optical disk and I-V amplifiers for converting output currents of the photodetectors to voltages, and outputs of the amplifiers are supplied to a read channel LSI and the like through the flexible cable. Accordingly, the influence of the crosstalk from the recording circuit system to the reproduction circuit system must be reduced on the flexible cable to prevent degradation of the reproduction S/N.

Figure 4:
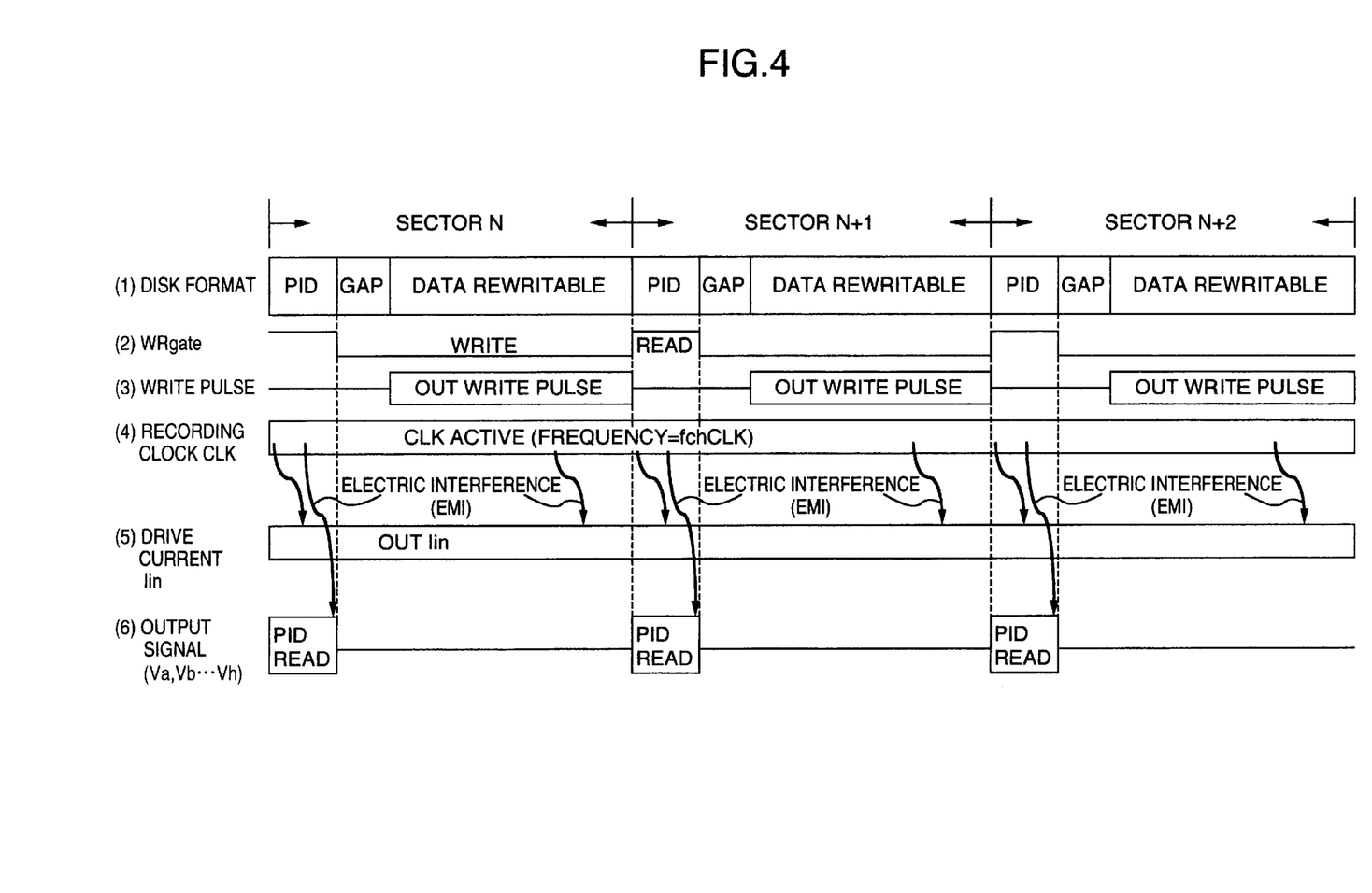
FIG. 4 is a diagram showing behavior of crosstalk of a recording clock with a reproduction system.

Especially, when a sector is defined as a unit of recording (storage of 2 Kbyte user data) as shown in a DVD-RAM (2.6 GByte) illustrated at (1) in FIG. 4 and physical address information of each sector in the form of pits is recorded on the head of each sector (this area is called PID), the PID must be reproduced sector by sector to confirm the address and then data to be recorded on a user data area of each sector must be recorded. In other words, even during recording of data, not only recording of data is carried out but also recording and reproduction of data is carried out repetitively.

When, as in the case of the semiconductor laser drive circuit constructed as above, the supply of clock signal CLK to the semiconductor laser drive circuit by way of signal lines such as the flexible cable (hereinafter simply referred to as "flexible cable") is kept even during PID reproduction as shown at (4) in FIG. 4 by taking stability of the frequency of the clock signal chCLK (output signal of the n-multiplying means) during user data recording following the PID into consideration, EMI of the clock signal CLK on the flexible cable (unwanted radiation emitted by the clock signal on the flexible cable) runs in a read signal(at (5) in FIG. 4) on the same flexible cable or on a flexible cable of the separately provided photoelectric conversion circuit to cause crosstalk, giving rise to a problem that the S/N of the reproduction signal is degraded.

An object of the present invention is to decrease leakage of the EMI of the clock signal necessary for recording of data to the reproduction signal and degradation of the S/N of the reproduction signal due to crosstalk and to suppress an increase of the EMI level which causes the S/N degradation of the reproduction signal.

DISCLOSURE OF INVENTION

To accomplish the above object, according to the present invention, an optical disk apparatus comprises a semiconductor laser drive circuit having LD recording drive current waveform generating means for generating a recording drive current waveform for a semiconductor laser by using a clock signal chCLK as operation clock when recording information on a recording medium and reproduction drive current supply means for supplying a reproduction drive current to the semiconductor laser when reading the information from the recording medium, recording clock supply means for supplying the clock signal chCLK to the semiconductor laser drive circuit, recording/reproduction mode control means for controlling recording/reproducing operation of the semiconductor laser drive circuit, and clock stop means for stopping the supply of the clock signal chCLK from the recording clock supply means to the semiconductor laser drive circuit when the output of the recording/reproduction mode control means designates reproducing operation.

Also, to accomplish the above object, according to the present invention, an optical disk apparatus comprises a semiconductor laser drive circuit having multiplying means for providing a clock signal chCLK which is n times (n being positive integer) the frequency of a clock signal CLK, LD recording drive current waveform generating means for generating a recording drive current waveform for a semiconductor laser by using the clock signal chCLK as operation clock when recording information on a recording medium and reproduction drive current supply means for supplying a reproduction drive current to the semiconductor laser when reading the information from the recording medium, recording clock supply means for supplying the clock signal CLK to the semiconductor laser drive circuit, recording/reproduction mode control means for controlling recording/reproducing operation of the semiconductor laser drive circuit, and clock stop means for stopping the supply of the clock signal CLK from the recording clock supply means to the semiconductor laser drive circuit when the output of the recording/reproduction mode control means designates reproducing operation.

BEST MODE FOR CARRYING OUT THE INVENTION

Embodiments of the present invention will be described hereunder with reference to the drawings.

(1) First Embodiment (1. 1) Construction of First Embodiment

Figure 1:
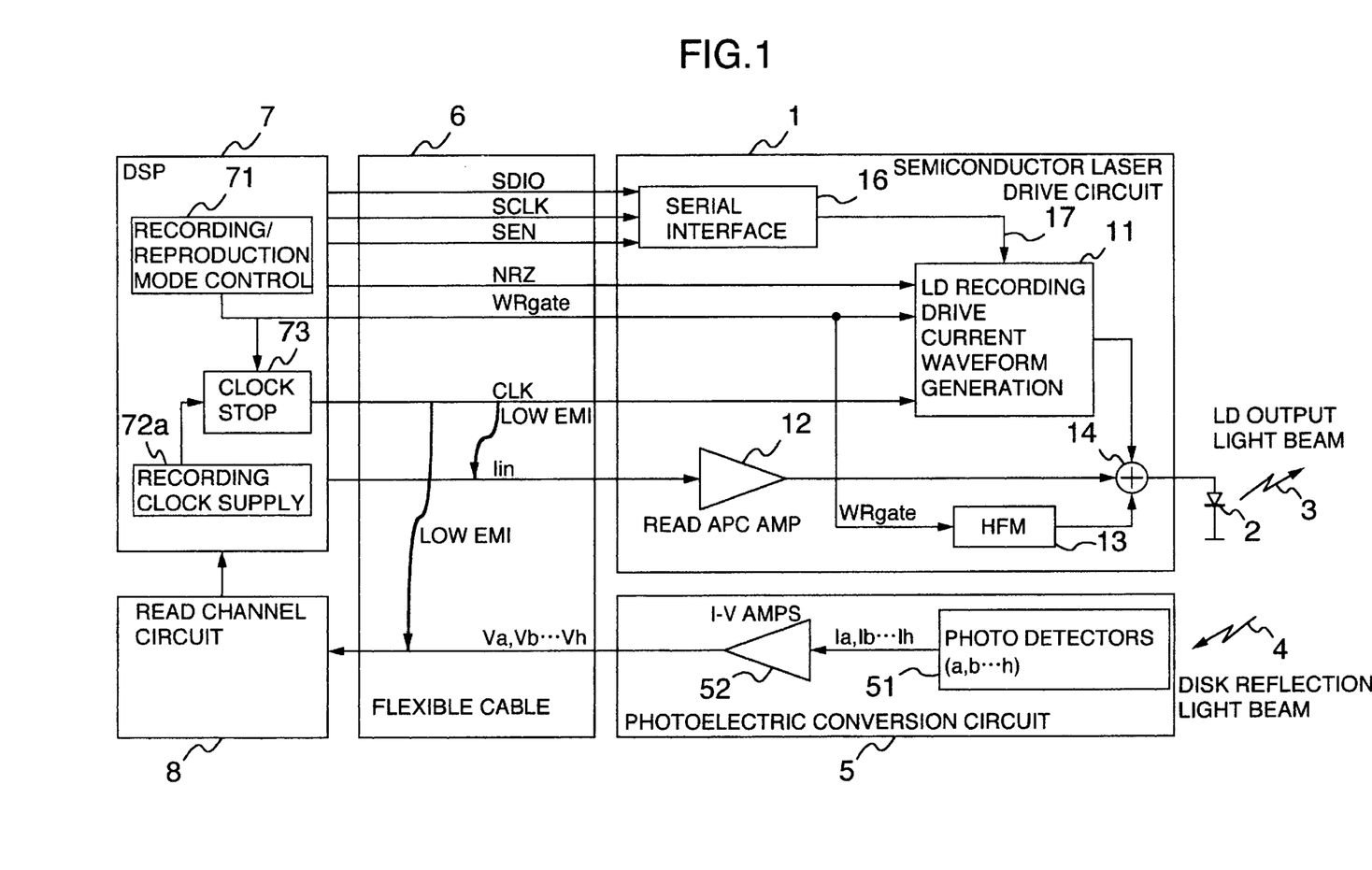
FIG. 1 is a diagram showing construction of a first embodiment of the invention.

Construction of the first embodiment of the present invention is shown in FIG. 1.

A semiconductor laser drive circuit 1 drives a semiconductor laser diode 2 and an LD output light beam 3 is emitted to an optical disk (not shown) representing a recording medium. A disk reflection light beam 4 representing a reflected light beam of the LD output light beam 3 emitted to the optical disk is detected by photodetectors 51 of a photoelectric conversion circuit 5 and current signals corresponding to a quantity of the reflected light beam are generated. Output currents of the photodetectors 51 are converted into voltage signals by means of I-V amplifiers 52 of the photoelectric conversion circuit 5. The photoelectric conversion circuit 5 delivers the voltage signals as output signals (Va, Vb . . . Vh). Wired in a flexible cable 6 are control signal lines of a digital signal processor (DSP) 7 for controlling the semiconductor laser drive circuit 1 and output signal lines of the photoelectric conversion circuit 5. A read channel circuit 8 processes the voltage signals from the photoelectric conversion circuit 5 and supplies them to the DSP 7.

The semiconductor laser drive circuit 1 has LD recording drive current waveform generating means 11 for generating a semiconductor laser drive current waveform during recording on the basis of a binary recording signal NRZ, a control signal WRgate for control of a recording/reproducing operation mode and a clock signal CLK, a serial interface circuit 16 for supplying drive waveform information 17 necessary for generation of the semiconductor laser drive waveform to the LD recording drive current waveform generating means 11, a read APC amplifier 12 for current amplification of a drive current Lin supplied from the DSP 7, a high frequency modulation circuit (HFM) 13 for supplying a high frequency current to the semiconductor laser 2 during reproduction, and adder means 14 for adding output currents of the LD recording drive current waveform generating means 11, read APC amplifier 12 and HFM 13 and supplying the sum to the semiconductor laser diode 2.

The DSP 7 has recording clock supply means 72a for supplying a recording clock to the semiconductor laser drive circuit 1, recording/reproduction mode control means 71 for controlling the mode of recording/reproducing operation of the semiconductor laser drive circuit 1, and clock stop means 73 for stopping the supply of the recording clock signal CLK from the recording clock supply means 72a to the semiconductor laser drive circuit when the output signal WRgate of the recording/reproduction mode control means 71 designates the reproduction mode. Also, the DSP 7 supplies to the serial interface circuit 16 an SEN signal for rendering the serial interface circuit 16 operative, a clock signal SCLK for the serial interface circuit 16 and a data signal SDIO for the serial interface circuit 16 so as to control the serial interface circuit 16.

The semiconductor laser drive circuit 1, semiconductor laser diode 2 and photoelectric conversion circuit 5 are carried on an optical pickup. The optical pickup can be moved in a radial direction of the optical disk in compliance with a recording position (address) and a reproduction position (address) when recording or reading on or from the optical disk is carried out. The control signals for the semiconductor laser drive circuit 1 are supplied from the DSP 7 through the flexible cable 6 as described previously. The output signals of the photoelectric conversion circuit 5 are supplied to the read channel circuit 8 through the flexible cable 6 as described previously.

(1. 2) Operation of First Embodiment

Operation of the first embodiment and details of each component will be described hereunder.

Operation of an optical disk apparatus of the present embodiment is controlled by the output signal WRgate of the recording/reproduction mode control means 71. When the control signal WRgate is L (recording mode designation), recording operation is effected and when H (reproduction mode designation), reproducing operation is effected.

(1. 2. 1) Generation of Control Signal WRgate

The control signal WRgate is generated by the DSP 7 on the basis of a PID (Physical Identification Data) section detecting signal, which is detected by the read channel circuit 8 on the basis of the output signals of the photoelectric conversion circuit 5 and delivered out of the read channel circuit 8, and a wobble signal due to wobble of the recording track.

A detailed description is given of a method for detection of the PID section and wobble signal in literature (1): NIKKEI ELECTRONICS (last volume), 1997.10.20 (no. 701), pages 178 to 182 fully explained by a planner of the whole aspect of DVD-RAM standards and in FIGS. 17 to 20 of the literature. The literature (1) describes the PID section as a header section and the PID section detecting signal as an address detection signal.

In the case of a DVD-RAM (2.6 Gbyte) format, the PID is divided into two as shown in FIG. 20 of the literature, the first half (headers 1, 2) being so disposed as to be ½ track width displaced toward the outer periphery (or inner periphery) from the recording track (data recording area) and the second half (headers 3, 4) being so disposed as to be ½ track width offset toward the inner periphery (or outer periphery). The recording track (data recording area) is formed in a wobble form and the wobble proceeds at a cycle of 232 cycle (1/186 of chCLK period) per sector.

Accordingly, the tracking signal (push-pull signal) generated on the basis of the output signal of the reproduction circuit system 5 varies largely at the PID section. For example, on the assumption that the outer periphery side is + side, a large variation toward the + side occurs during the first half of the PID and a large variation toward the —side occurs during the second half. This behavior is indicated in FIG. 20 of the literature. By utilizing the variation, the PID section is detected. Since the recording track wobbles, the wobble is equivalent to an error in the tracking signal, enabling the wobble signal to be detected.

The DSP 7 generates the control signal WRgate on the basis of the PID section detecting signal and a chCLK signal generated by n-multiplying of the wobble signal.

Figure 5:
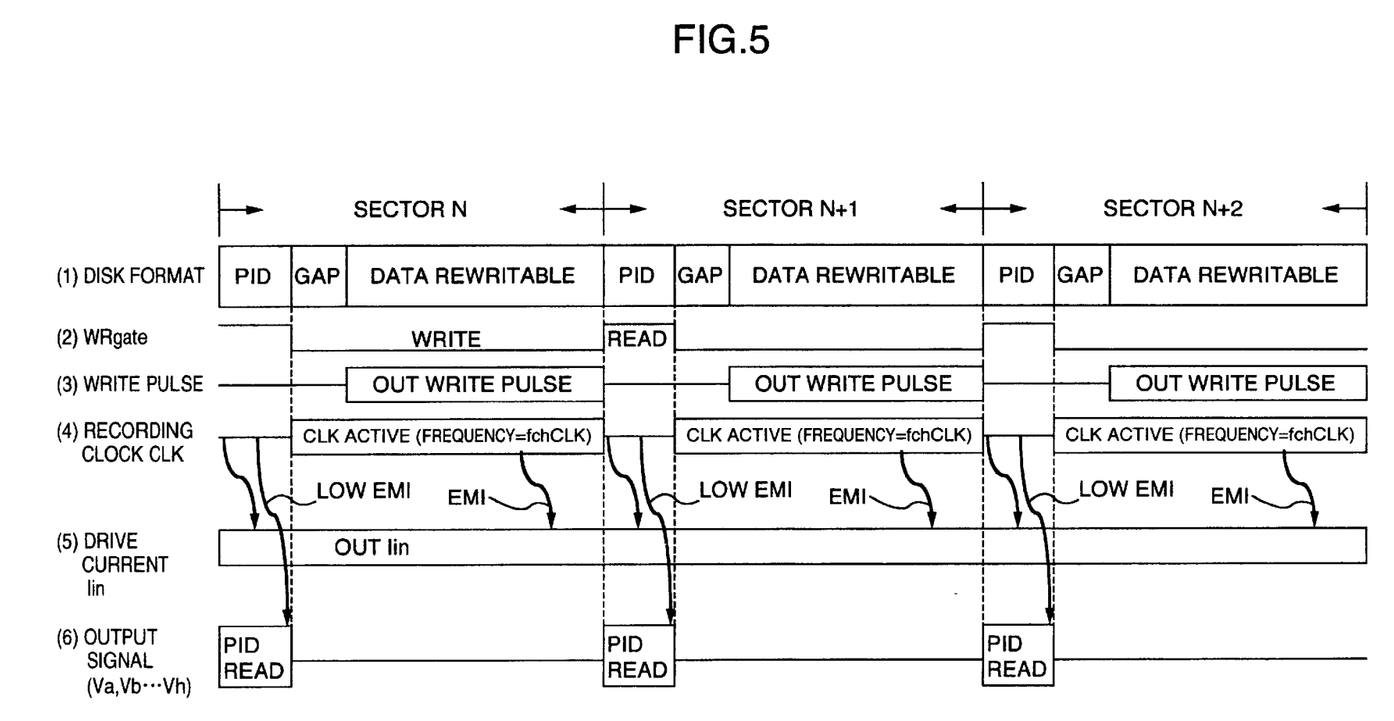
FIG. 5 is a diagram showing operation timings in the first embodiment.

Prior to a sequential recording operation of a plurality of sectors, the control signal WRgate is first conditioned for reproduction to perform detection of the aforementioned PID section and detection of the current address, address detection of PID is carried out until a desired sector and after the desired sector has been detected, the control signal WRgate is conditioned for recording at recording data areas as shown at (2)in FIG. 5. Start and termination timings for the recording data area of each sector are determined on the basis of a coefficient of the chCLK signal generated from the previously described wobble signal.

(1. 2. 2) Reproducing Operation

Reproducing operation is effected when the output signal WRgate of the recording/reproduction mode control means 71 is at a logical high (H). At that time, in the semiconductor laser drive circuit 1, the read APC amplifier 12 current-amplifies the reproduction drive current Iin supplied from the DSP 7 through the flexible cable 6 and a resulting current is added with a high frequency current signal from the high frequency multiplexing circuit 13 by means of the adder means 14 to drive the semiconductor laser diode 2. The semiconductor laser diode 2 is caused to luminesce by reproduction power so as to illuminate the optical disk. Reflection light beam 4 from the optical disk is guided to the photodetectors 51 and each of the photodetectors (a to h totaling to 8) detects a quantity of reception light. Currents corresponding to the reception light quantities of the individual photodetectors are subjected to current-to-voltage conversion by means of the I–V amplifiers (a to h totaling to 8 circuits) corresponding to the photodetectors and resulting voltages (detection signals Va to Vh in the Figure) are supplied to the read channel circuit 8 through the flexible cable 6.

(1. 2. 3) Recording Operation

Recording operation is effected when the output signal WRgate of the recording/reproduction mode control means 71 is at a logical low (L).

At that time, in the semiconductor laser drive circuit 1, the recording drive current from the LD recording drive current generating means 11 is added with the drive current of the read APC amplifier 12 (the same current as the reproduction drive current during reproducing operation) at the adder circuit 14 so as to drive the semiconductor laser diode 2.

The LD recording drive current generating means 11 generates a recording drive current waveform corresponding to a length of a mark to be recorded (mark length being, for example, 3T, 4T, . . . , 11T) and a length of an adjoining space (space length being, for example, 3T, 4T, . . . , 11T) on the basis of the binary recording signal NRZ and clock signal CLK (in the first embodiment, corresponding to a channel clock signal, that is, corresponding to the period of a minimum unit of change of the NRZ signal). What type of recording drive current waveform is to be formed is set by the recording drive waveform information 17 supplied from the DSP 7 through the serial interface 16.

(1. 2. 4) Operation Timings

In FIG. 5, operation timings in the first embodiment are shown. In the Figure, a format of the optical disk (disk format) is depicted at (1), a signal waveform of the control signal WRgate is depicted at (2), and sections (timings) at which the recording drive current waveform (write pulse) is delivered out of the LD recording drive current generating means 11 or adder circuit 14 are depicted at (3). Further, in the Figure, sections (timings) at which the recording clock signal CLK is supplied to the semiconductor laser drive circuit 1 through the flexible cable 6 are depicted at (4), a section (timing) at which the drive current Iin is delivered is depicted at (5) and sections at which the PID (physical ID recorded with physical address information of each sector) is reproduced and the output signals (Va, Vb . . . Vh) of the respective I–V amplifiers 52 are supplied to the read channel circuit 8 through the flexible cable 6 are depicted at (6).

Like the DVD-RAM disk, for example, this disk format has a unit of recording defined by a sector unit and each sector includes a field (user data area (DATA rewritable) having a length of about 2418×16T) for recording 2048-byte user data and an error correction sign, an area (PID having a length of 128×16T) on which physical address information on the disk of each sector is recorded (in the form of pits) in advance and an area (GAP being, more strictly, comprised of a gap and a guard area and having a length of about 30×16T) serving as a buffer area between the two areas.

When user data is recorded on the sector N, the PID of the sector N is reproduced to confirm a physical address of the sector to be recorded with data and there-after recording is carried out. This aims at preventing data from being recorded on an erroneous sector and data, already recorded, from being destroyed and lost in the case of the scheme capable of recording at random in a unit of sector (this realizes the capability of random access in recording and reproduction inherent in the optical disk) in contrast to the conventional scheme for sequential data recording (for example, the recording method such as CD-R). So to speak, even in the recording mode, in addition to mere effectuation of recording, recording of data and reproduction of PID are repeated.

In compliance with the disk format described above, the recording/reproduction mode control means 71 delivers, as shown at (2) in the Figure, a control signal WRgate which designates the reproduction mode (read) at the PID section and the recording mode (write) at the GAP area and user data area ("DATA rewritable" at (1) in the Figure).

The clock stop means 71 responds to the mode designated by the control signal WRgate to control the supply/stop of the recording clock CLK to be supplied to the semiconductor laser drive circuit 1. As shown at (4) in the Figure, the supply of the recording clock CLK is stopped when the WRgate is H (reproduction mode) and the recording clock CLK is supplied when L (recording mode).

The LD recording drive current waveform generating means 11 generates a recording drive current waveform on the basis of the supplied recording clock CLK and binary recording signal NRZ and the generated waveform is then added with the drive current Iin, thereby driving (out write pulse) the semiconductor laser diode 2 at timings (user data area) shown at (3) in the Figure to form mark and space on the disk.

In the operation timings as above, during a period for delivery of the output signal shown at (6) in the Figure, that is, during the PID reproduction period, the delivery of the recording clock CLK is stopped, with the result that the influence of EMI of the recording clock upon the drive current Iin and output signals (Va, Vb . . . Vh) can be decreased as compared to the case where the delivery of the recording clock CLK keeps and as compared to the case where the delivery of the binary recording signal NRZ keeps (out write pulse).

(1. 3) Effects of First Embodiment

As described above, in the first embodiment, the recording clock CLK is stopped during PID reproduction to bring about the following effects.

a) Since crosstalk of the recording clock CLK due to EMI with the output signals (Va, Vb . . . Vh) of the photoelectric conversion circuit 5 can be reduced on the flexible cable 6, the error rate of data reproduction such as PID can be reduced.

b) Crosstalk of the recording clock CLK due to EMI with the drive current Iin determining the drive current for the semiconductor laser diode during reproduction can be reduced on the flexible cable 6, variation due to the crosstalk in the output light beam of the semiconductor laser diode 2 can be reduced and consequently, S/N degradation in the reproduction signal can be prevented to thereby reduce the error rate of data reproduction such as PID.

c) Since the crosstalk of the recording clock with the reproduction signal system can be reduced on the flexible cable 6 as described above, the recording clock signal, reproduction circuit system output signals and drive current signal Iin can be arranged in close proximity to each other on the flexible cable and the width of the flexible cable can be reduced to permit reduction in size of the apparatus.

(2) Second Embodiment (2. 1) Construction of Second Embodiment

Figure 2:
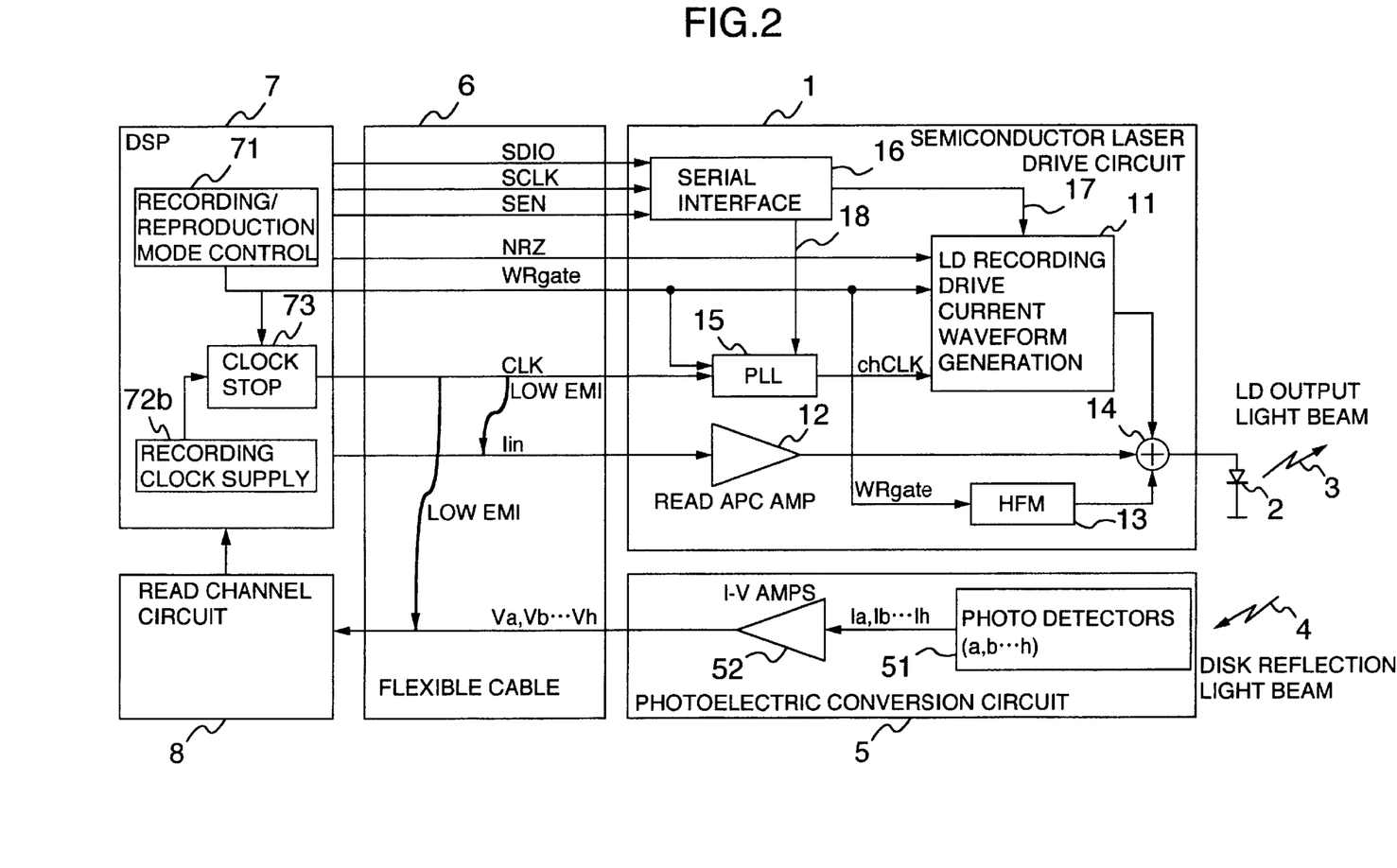
FIG. 2 is a diagram showing construction of a second embodiment of the invention.

Construction of a second embodiment of the present invention is shown in FIG. 2. Components having the same function as those in FIG. 1 are designated by the same reference numerals.

Structurally, the present embodiment differs from the optical disk apparatus according to the first embodiment in that there is provided multiplying means (phase locked loop) 15 for multiplying a clock signal CLK supplied by way of the clock stop means 73 to generate a channel clock signal chCLK and supplying it to the LD recording drive current waveform generating means 11.

Figure 3:
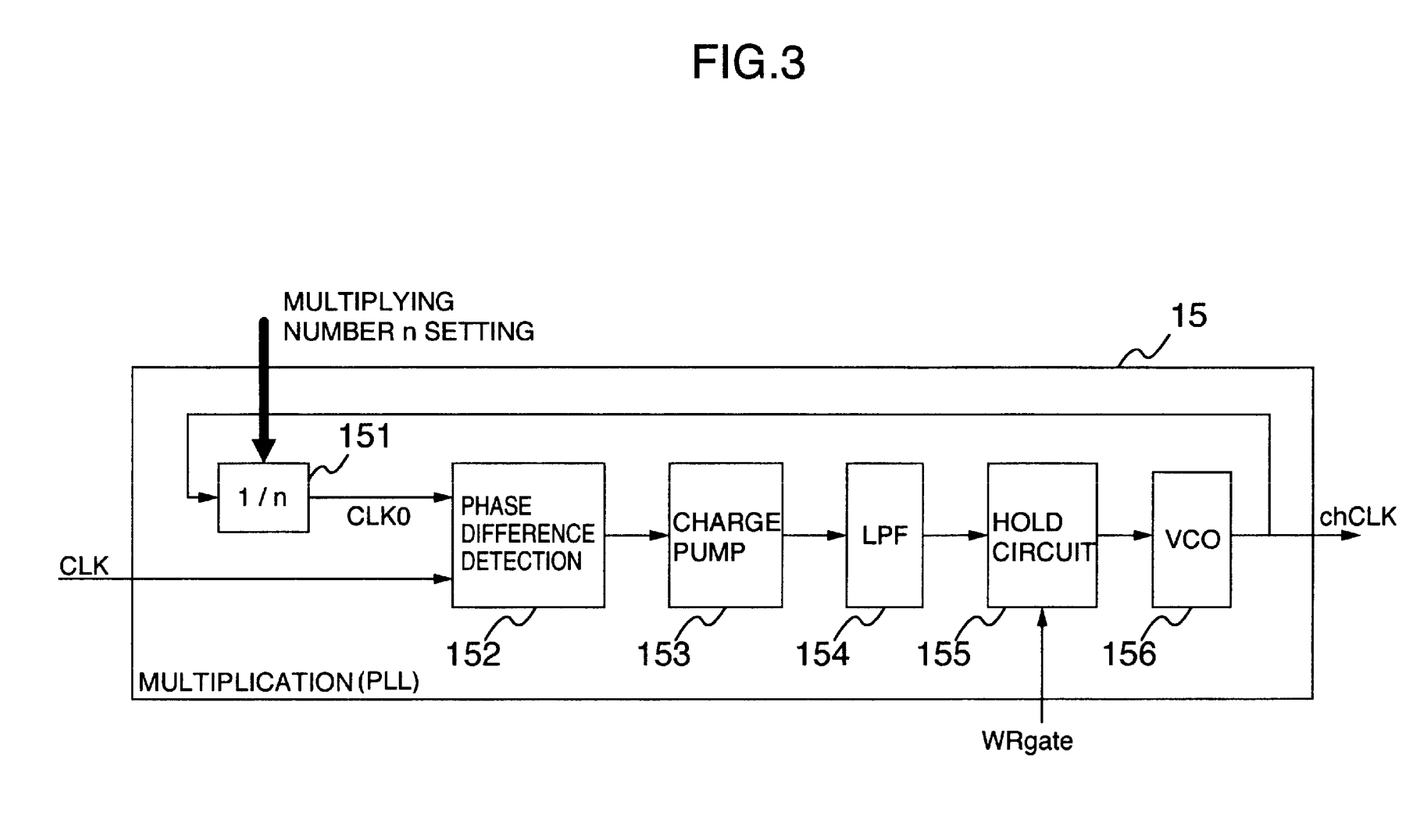
FIG. 3 is a diagram showing construction of a PLL in the second embodiment.

Construction of the multiplying means (PLL) 15 is shown in FIG. 3. A frequency division circuit 151 n-divides the frequency of the output signal chCLK of a VCO (voltage controlled oscillator) 156. A phase difference detection circuit 152 detects a phase difference between an output signal CLKO of the frequency division circuit 151 and the recording clock signal CLK supplied by way of the clock stop means 73. A charge pump circuit 153 generates a voltage corresponding to the detected phase difference of the phase difference detection circuit 152. An LPF (low-pass filter) 154 smooths the output signal of the charge pump circuit 153. A hold circuit 155 holds an output value of the LPF 154 when the control signal WRgate is H (reproduction mode). The VCO 156 changes its oscillation frequency in compliance with the output value of the LPF 154 supplied through the hold circuit 155. The output signal of the VCO 156 is supplied as the channel clock signal chCLK to the LD recording drive current waveform generating means 11.

(2. 2) Operation of Second Embodiment

A multiplying number n of the multiplying means (PLL) 15 is set by the DSP 7 through the serial interface 16.

Recording clock supply means 72b responds to the multiplying number n information 18 to deliver a recording clock CLK having a frequency which is 1/n of the frequency fchCLK of the channel clock chCLK. The multiplying means (PLL) 15 generates the channel clock chCLK by n-multiplying the frequency of the recording clock CLK and supplies it to the LD recording drive current waveform generating means 11. The LD recording drive current waveform generating means 11 generates a recording drive current waveform on the basis of the binary recording signal NRZ and the channel clock signal chCLK supplied from the multiplying means (PLL) 15. Then, the thus generated current is added with the drive current Iin to drive the semiconductor laser driver 2

(2. 2. 1) Operation Timings

Figure 6:
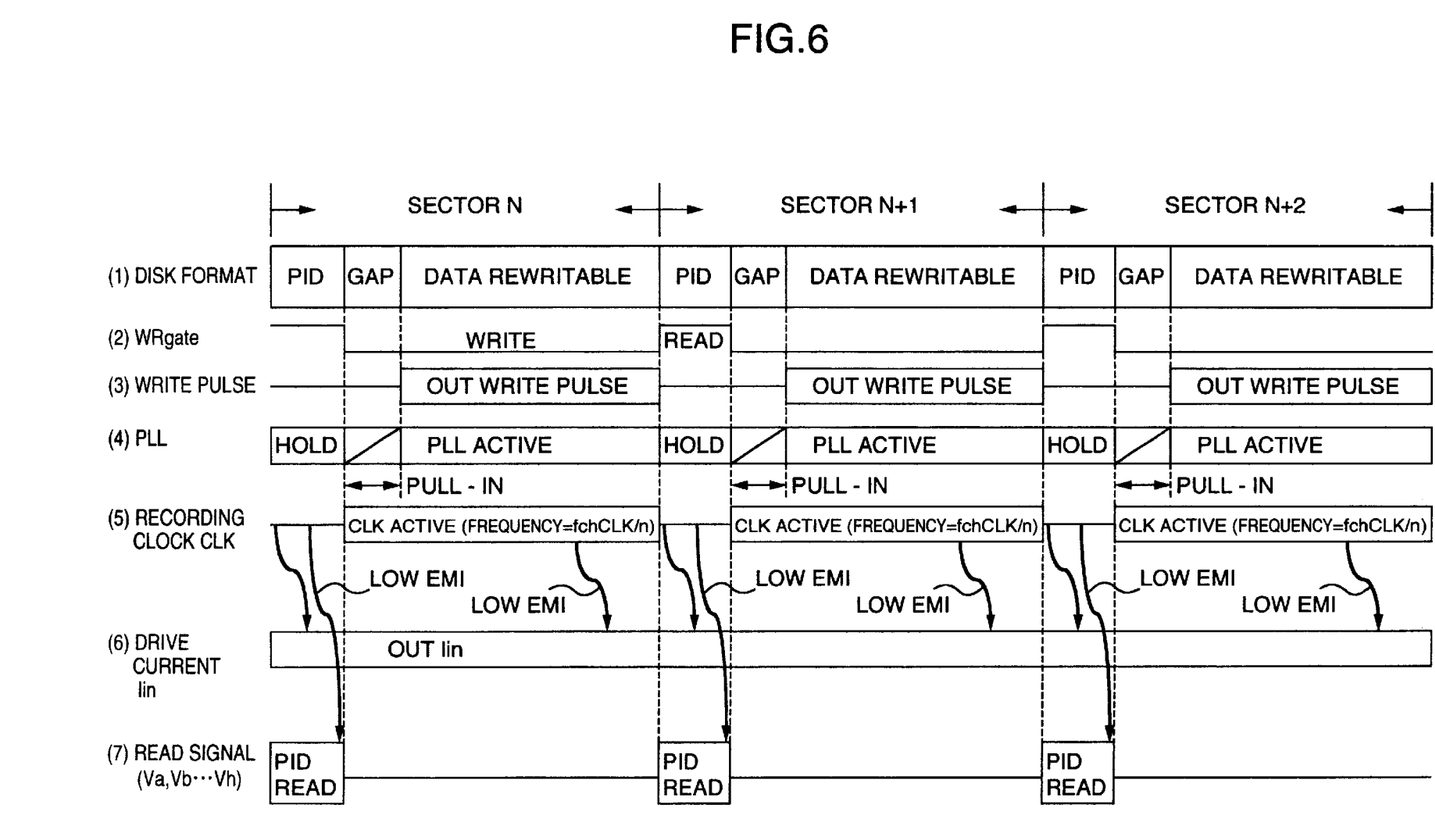
FIG. 6 is a diagram showing operation timings in the second embodiment.

Operation timings in the second embodiment are shown in FIG. 6. In the figure, a format of the optical disk (disk format) is depicted at (1) in FIG. 6, the control signal WRgate is depicted at (2) in FIG. 6 and sections (timings) at which the recording drive current waveform (write pulse) is delivered out of the LD recording drive current waveform generating means 11 or adder circuit 14 are depicted at (3) in FIG. 6. These are the same as the operation timings in the first embodiment. In the Figure, a timing for operation of the multiplying means (PLL) 15 is depicted at (4) in FIG. 6 and sections (timings) at which the recording clock CLK (in the second embodiment, the frequency of the CLK is 1/n of the channel clock chCLK) is supplied to the semiconductor laser drive circuit 1 through the flexible cable 6 are depicted at (5) in FIG. 6. In the Figure, a section (timing) at which the drive current Iin is delivered is depicted at (6) in FIG. 6 and sections (timings) at which the PID is reproduced and the output signal of each I–V amplifier 52 is supplied to the read channel circuit 8 through the flexible cable 6 are depicted at (7) in FIG. 6.

When user data is recorded in a sector unit, like the first embodiment, the recording/reproduction mode control means 71 renders the control signal WRgate H (reproduction mode) at the PID sections and renders it L (recording mode) at the GAP and user data area.

Like the first embodiment, the clock stop means 73 stops the supply of the recording clock CLK from the recording clock supply means 72b to the semiconductor laser drive circuit 1 when the WRgate is H (reproduction mode) and supplies the recording clock CLK to the semiconductor laser drive circuit 1 when the WRgate is L (recording mode).

When the control signal WRgate is L (recording mode), the multiplying means (PLL) 15 receives, as an input signal, the recording clock CLK supplied through the clock stop means 73 as shown at (4) in FIG. 6 and operates to cause the phase of the input signal to coincide with that of the output signal CLKO of the frequency division circuit 151. With the phases of the two rendered to be coincident with each other, the output of the VCP 156 consequently becomes the channel clock chCLK which is n times the CLK and the channel clock is supplied to the LD recording drive current waveform generating means 11. When the control signal WRgate is H (reproduction mode), the hold circuit 155 holds an immediately preceding (immediately before the change of the WRgate from L to H) output value of the LPF 154.

The oscillation frequency of the VCO 156 is controlled by the output value of the hold circuit 155. Accordingly, during the section at which the WRgate is H (reproduction mode), the supply of the recording clock CLK is stopped but the oscillation frequency of the VCO 156 holds a frequency which is substantially equal to the frequency when the WRgate is L (recording mode).

By holding the oscillation frequency of the VCO 156 at the PID reproduction section, pull-in of the VCO 156 to the recording clock CLK (operation to cause the frequency division circuit output CLKO to coincide with the frequency of the recording clock CLK and to make the phases coincident with each other) can be effected more speedily when the WRgate again comes into L (recording mode). The reason for this is that the held frequency of the VCO 156 is close to n times the recording clock CLK, in other words, the frequency of the output CLKO of the frequency division circuit nearly equals the frequency of the recording clock CLK and therefore the control time for making the frequency of the CLKO coincident with the frequency of the CLK can be shortened.

Since at the operation timings as above the delivery of the recording clock CLK is stopped during the period shown at (6) in the Figure in which the output signal is delivered, that is, during the PID reproduction period as in the case of the first embodiment, the influence of the recording clock due to EMI upon the drive current Iin and output signals (Va, Vb . . . Vh) can be reduced as compared to the case where the delivery of the recording clock CLK keeps and to the case where the delivery of the binary recording signal NRZ keeps (out write pulse).

Further, the frequency of the recording clock CLK passing on the flexible cable 6 can be reduced as compared to that in the first embodiment and consequently, the influence of the recording clock CLK due to EMI can be reduced by itself.

(2. 3) Effects of Second Embodiment

As described above, in the second embodiment, the following effects can be brought about in addition to those attained by the first embodiment.

d) Since the recording clock CLK is n-multiplied on the side of the semiconductor laser drive circuit 1 (optical pickup side) by means of the multiplying means (PLL) 15, the frequency of the recording clock CLK on the flexible cable 6 can be reduced to 1/n. Accordingly, the level of unwanted radiation (EMI) emitted from the flexible cable 6 can be reduced as compared to that in the first embodiment, so that crosstalk with the drive current Iin during data recording can be reduced as compared to that in the first embodiment. Namely, the recording drive current waveform can be generated with higher accuracy in the present embodiment than in the first embodiment.

e) By holding the oscillation frequency of the VCO 156 at the reproduction mode section, the oscillation frequency of the VCO 156 can be pulled in to n times the frequency of the recording clock CLK more speedily at the time that the recording mode starts, with the result that variation of the channel clock chCLK at the user data area can be reduced to thereby prevent degradation of reliability of the recording data.

Industrial Applicability

In the optical disk apparatus of the present invention, S/N degradation in the reproduction signal can be reduced. Further, an increase in the EMI level which causes the S/N degradation in the reproduction signal can be suppressed.

Especially, in an optical disk apparatus in which recording of data is carried out by reading address information on the optical disk and confirming the recording position, the error rate of reproduction of data such as address information can be reduced and hence reliability of data recording can be promoted.

What is claimed is:

1. An optical disk apparatus comprising:

a flexible cable;

a semiconductor laser drive circuit, connected to the flexible cable, including laser drive (LD) recording drive current waveform generating means for generating a recording drive current waveform for a semiconductor laser based on a clock signal when recording information on a recording medium, and reproduction drive current supply means for supplying a reproduction drive current to the semiconductor laser when reading information from the recording medium;

recording clock supply means, connected to the flexible cable, for supplying the clock signal to the semiconductor laser drive circuit through the flexible cable;

signal processing means, connected to the flexible cable, for supplying mark length information representing information to be recorded on the recording medium to the semiconductor laser drive circuit through the flexible cable;

recording/reproduction mode control means for controlling a recording/reproduction operation of the semiconductor laser drive circuit; and clock stop means for stopping the clock signal from being supplied from the recording clock supply means to the semiconductor laser drive circuit when an output of the recording/reproduction mode control means designates a reproduction operation;

wherein the laser drive (LD) recording drive current waveform generating means generates the recording drive current waveform based on the mark length information and the clock signal.

2. An optical disk apparatus according to claim 1, wherein the signal processing means also supplies drive waveform information to the semiconductor laser drive circuit through the flexible cable; and wherein the laser drive (LD) recording drive current waveform generating means generates the recording drive current waveform for the semiconductor laser based on the mark length information, the clock signal, and the drive waveform information.

3. An optical disk apparatus comprising:

a flexible cable;

a semiconductor laser drive circuit, connected to the flexible cable, including multiplying means for generating a second clock signal having a frequency which is n times a frequency of a first clock signal (n being a positive integer), laser drive (LD) recording drive current waveform generating means for generating a recording drive current waveform for a semiconductor laser based on the second clock signal when recording information on a recording medium, and reproduction drive current supply means for supplying a reproduction drive current to the semiconductor laser when reading information from the recording medium;

recording clock supply means, connected to the flexible cable, for supplying the first clock signal to the semiconductor laser drive circuit through the flexible cable;

signal processing means, connected to the flexible cable, for supplying mark length information representing information to be recorded on the recording medium to the semiconductor laser drive circuit through the flexible cable;

recording/reproduction mode control means for controlling a recording/reproduction operation of the semiconductor laser drive circuit; and clock stop means for stopping the first clock signal from being supplied from the recording clock supply means to the semiconductor laser drive circuit when an output of the recording/reproduction mode control means designates a reproduction operation;

wherein the laser drive (LD) recording drive current waveform generating means generates the recording drive current waveform based on the mark length information and the second clock signal.

4. An optical disk apparatus according to claim 3, wherein the signal processing means also supplies drive waveform information to the semiconductor laser drive circuit through the flexible cable; and wherein the laser drive (LD) recording drive current waveform generating means generates the recording drive current waveform for the semiconductor laser based on the mark length information, the second clock signal, and the drive waveform information.

5. An optical disk apparatus according to claim 3, wherein the multiplying means includes:

phase difference detection means for detecting a phase difference between the first clock signal and the second clock signal;

a VCO having a variable oscillation frequency which changes in accordance with the phase difference detected by the phase difference detection means; and hold means for holding the oscillation frequency of the VCO at an oscillation frequency prevailing immediately before a beginning of the reproduction operation when the output of the recording/reproduction mode control means designates the reproduction operation.

6. An optical disk apparatus according to any one of claims 1, 3, or 5, further comprising an optical pickup which carries the semiconductor laser drive circuit.

7. An optical disk apparatus constructed to supply signals for controlling a semiconductor laser drive circuit carried on an optical pickup from a signal processing circuit to the semiconductor laser drive circuit through a flexible cable;

wherein the semiconductor laser drive circuit is constructed to generate a drive current signal for a semiconductor laser based on a binary signal representing data to be recorded using the optical pickup and a clock signal which are supplied from the signal processing circuit to the semiconductor laser drive circuit through the flexible cable; and wherein the signal processing circuit is constructed to supply the clock signal to the semiconductor laser drive circuit through the flexible cable during recording of data, and to stop supplying the clock signal to the semiconductor laser drive circuit through the flexible cable during reproduction of data.

8. An optical disk apparatus according to claim 7, wherein drive waveform information is supplied from the signal processing circuit to the semiconductor laser drive circuit through the flexible cable; and wherein the semiconductor laser drive circuit is constructed to generate the drive current signal for the semiconductor laser based on the binary signal, the clock signal, and the drive waveform information which are supplied from the signal processing circuit to the semiconductor laser drive circuit through the flexible cable.

9. An optical disk apparatus constructed to supply a signal for controlling a semiconductor laser drive circuit carried on an optical pickup from a signal processing circuit to the semiconductor laser drive circuit through a flexible cable;

wherein the semiconductor laser drive circuit is constructed to generate a drive current signal for a semiconductor laser based on a binary signal representing data to be recorded using the optical pickup and a clock signal which are supplied from the signal processing circuit to the semiconductor laser drive circuit through the flexible cable; and wherein the signal processing circuit is constructed to supply the clock signal to the semiconductor laser drive circuit through the flexible cable during a period in which the binary signal is supplied from the signal processing circuit to the semiconductor laser drive circuit through the flexible cable, and to stop supplying the clock signal to the semiconductor laser drive circuit through the flexible cable during a period in which the binary signal is not supplied from the signal processing circuit to the semiconductor laser drive circuit through the flexible cable.

10. An optical disk apparatus according to claim 9, wherein drive waveform information is supplied from the signal processing circuit to the semiconductor laser drive circuit through the flexible cable; and wherein the semiconductor laser drive circuit is constructed to generate the drive current signal for the semiconductor laser based on the binary signal, the clock signal, and the drive waveform information which are supplied from the signal processing circuit to the semiconductor laser drive circuit through the flexible cable.

11. An optical disk apparatus according to claim 7 or 9, wherein the semiconductor laser drive circuit is constructed to generate a drive current signal for the semiconductor laser during data recording based on the binary signal, the clock signal, and a drive current signal for the semiconductor laser during data reproduction which is supplied from the signal processing circuit to the semiconductor laser drive circuit through the flexible cable.

12. An optical disk apparatus according to claim 7 or 9, wherein the semiconductor laser drive circuit is constructed to generate the drive current signal for the semiconductor laser based on a multiplied clock signal obtained by multiplying by n times a frequency of the clock signal supplied from the signal processing circuit to the semiconductor laser drive circuit through the flexible cable (n being a positive integer).

13. An optical disk apparatus according to claim 7 or 9, wherein address information recorded on an optical disk is reproduced to confirm a recording position on the optical disk, and thereafter data is recorded on the optical disk.

* * * * *